United States Patent
Kelly

(10) Patent No.: US 10,520,056 B2
(45) Date of Patent: Dec. 31, 2019

(54) IMPACT ABSORBING APPARATUS

(71) Applicant: KLNP, LLC, Cold Spring Harbor, NY (US)

(72) Inventor: James Kelly, Denver, CO (US)

(73) Assignee: KLNP, LLC, Cold Spring Harbor, NY (US)

( * ) Notice: Subject to any disclaimer, the term of this patent is extended or adjusted under 35 U.S.C. 154(b) by 0 days.

(21) Appl. No.: 15/858,353

(22) Filed: Dec. 29, 2017

(65) Prior Publication Data

US 2018/0187741 A1   Jul. 5, 2018

Related U.S. Application Data

(60) Provisional application No. 62/440,521, filed on Dec. 30, 2016, provisional application No. 62/440,529, filed on Dec. 30, 2016.

(51) Int. Cl.
*F16F 13/10* (2006.01)
*A63B 71/10* (2006.01)

(52) U.S. Cl.
CPC ............ *F16F 13/10* (2013.01); *F16F 13/105* (2013.01); *A63B 71/10* (2013.01); *A63B 2209/02* (2013.01); *F16F 2224/025* (2013.01)

(58) Field of Classification Search
CPC .... F16F 13/10; F16F 13/105; F16F 2224/025; A63B 2209/02; A63B 71/10; A42B 3/121
See application file for complete search history.

(56) References Cited

U.S. PATENT DOCUMENTS

| | | | | |
|---|---|---|---|---|
| 2,664,567 A | * | 1/1954 | Nichols | A42B 3/122 177/DIG. 7 |
| 3,679,159 A | * | 7/1972 | Bach | F16F 9/0472 188/268 |
| 3,713,640 A | * | 1/1973 | Margan | A42B 3/122 2/413 |
| 4,038,700 A | * | 8/1977 | Gyory | A42B 3/0473 2/413 |
| 4,375,108 A | | 3/1983 | Gooding | |
| 4,566,137 A | | 1/1986 | Gooding | |
| 4,762,308 A | * | 8/1988 | Geno | B60G 15/14 137/849 |
| 8,128,165 B2 | * | 3/2012 | Marsden | B60N 2/2851 297/216.11 |
| 8,863,320 B2 | * | 10/2014 | Kelly | A42B 3/122 2/413 |
| 2007/0190293 A1 | * | 8/2007 | Ferrara | B29C 45/0053 428/166 |
| 2008/0256686 A1 | * | 10/2008 | Ferrara | A41D 13/0155 2/413 |

(Continued)

*Primary Examiner* — Vishal R Sahni
(74) *Attorney, Agent, or Firm* — Workman Nydegger

(57) ABSTRACT

An impact absorbing apparatus includes a first chamber including a first chamber wall and a first valve disposed in the first chamber wall. The impact absorbing apparatus includes a second chamber including a second chamber wall and a second valve disposed in the second chamber wall. A plurality of connecting pillars connects the first chamber to the second chamber. The plurality of connecting pillars is configured to shift position in response to a first impact. The first valve is configured to pass air in and out of the first chamber. The second valve is configured to pass air in and out of the second chamber.

20 Claims, 9 Drawing Sheets

(56) References Cited

U.S. PATENT DOCUMENTS

| | | | |
|---|---|---|---|
| 2010/0295341 A1* | 11/2010 | Marsden | B60N 2/2851 |
| | | | 297/216.11 |
| 2011/0171420 A1* | 7/2011 | Yang | A41D 13/0156 |
| | | | 428/116 |
| 2014/0201890 A1 | 7/2014 | Kelly et al. | |
| 2015/0033454 A1 | 2/2015 | Kelly et al. | |

* cited by examiner

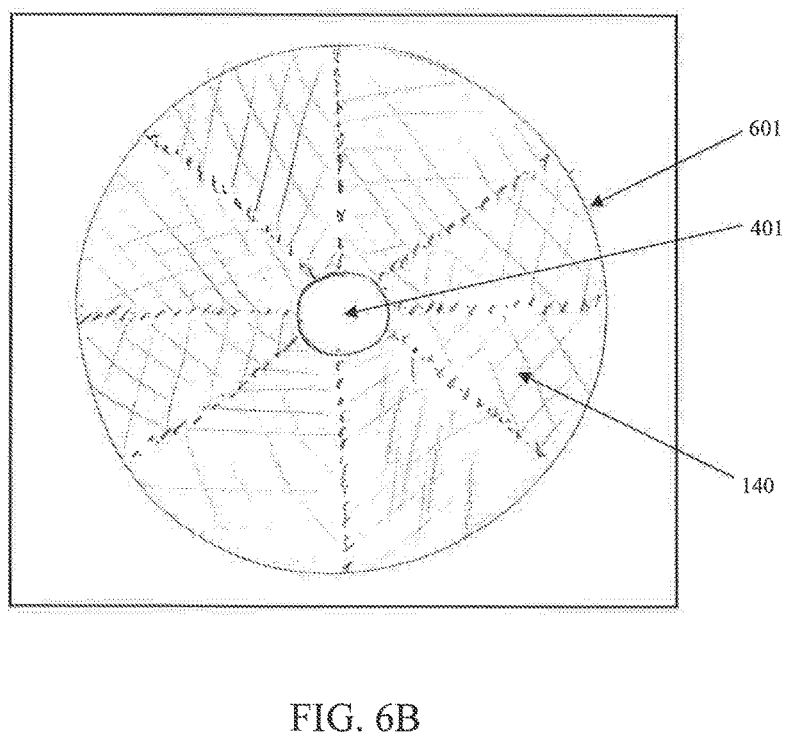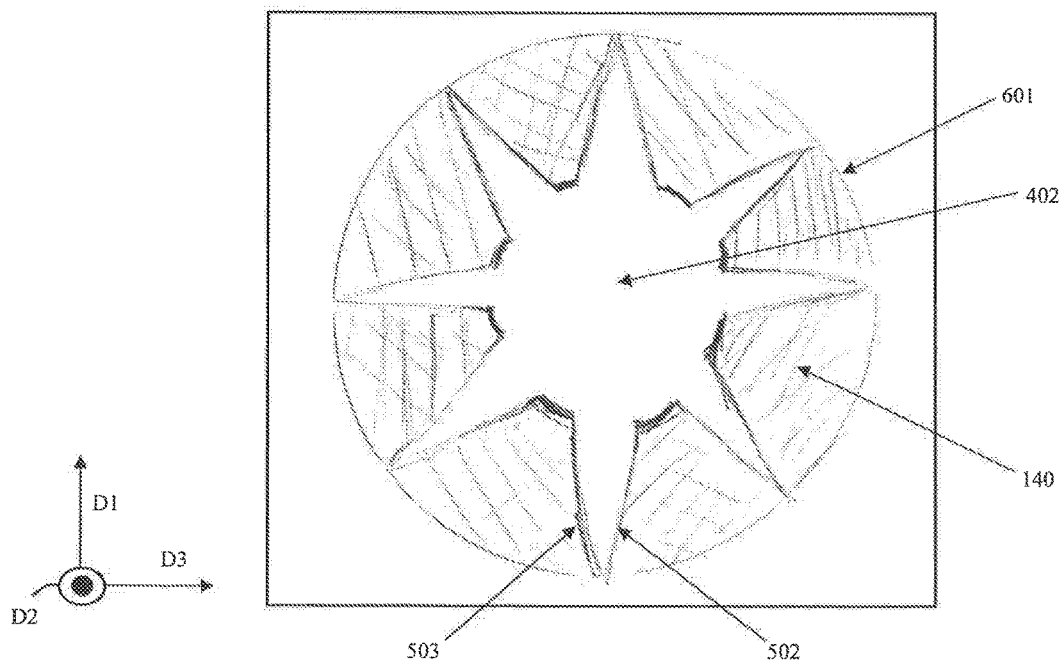

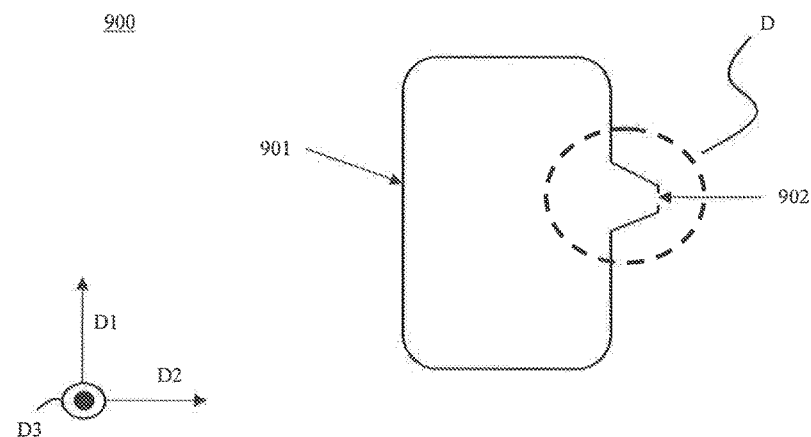
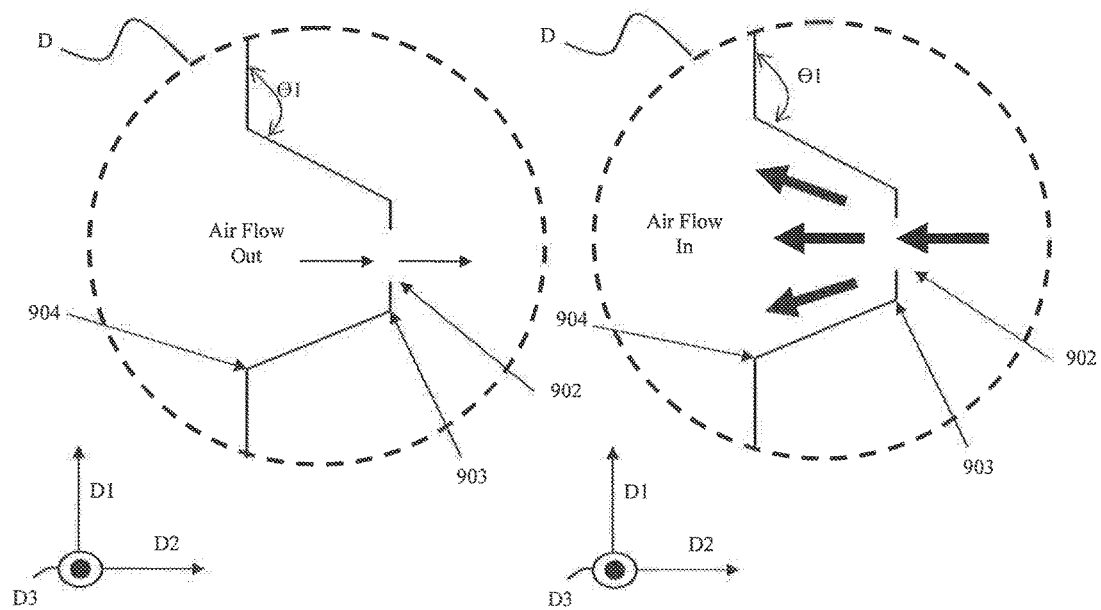

IMPACT ABSORBING APPARATUS

CROSS-REFERENCE TO RELATED APPLICATION

This U.S. Non-Provisional patent application claims priority to U.S. Provisional Patent Application No. 62/440,521, filed on Dec. 30, 2016 and U.S. Provisional Patent Application No. 62/440,529, filed on Dec. 30, 2016, the disclosure of which is incorporated by reference herein in its entirety.

TECHNICAL FIELD

The present invention relates to an impact absorbing apparatus. More particularly, exemplary embodiments of the present invention relate to an impact absorbing apparatus usable in a helmet or safety equipment.

SUMMARY

An exemplary embodiment of the present invention provides an impact absorbing apparatus includes a first chamber including a first chamber wall and a first valve disposed in the first chamber wall. The first valve is configured to pass air out of the first chamber at a first rate when the first valve is in a closed state. The first valve is configured to pass air into the first chamber at a second rate when the first chamber is in an open state. The second rate is faster than the first rate. The impact absorbing apparatus includes a second chamber including a second chamber wall and a second valve disposed in the second chamber wall. The second valve is configured to pass air out of the second chamber at a third rate when the second valve is in a closed state. The second valve is configured to pass air into the second chamber at a fourth rate when the second valve is in an open state. The fourth rate is faster than the third rate. A plurality of connecting pillars connects the first chamber to the second chamber. The plurality of connecting pillars is configured to shift position in response to a first impact. The first valve is configured to pass air out of the first chamber at the first rate in response to a second impact. The second valve is configured to pass air out of the second chamber at the third rate in response to a third impact.

According to an exemplary embodiment of the present invention, the first valve may include a plurality of first valve leaflets. Each of the first valve leaflets may include an outer wall connected to the first chamber wall, first and second side walls projecting away from the first chamber wall, and a curved inner wall opposite the outer wall. The curved inner walls of the first valve leaflets may form a first aperture configured to pass air out of the first chamber at the first rate when the first valve is in a closed position.

According to an exemplary embodiment of the present invention, the second valve may include a plurality of second valve leaflets. Each of the second valve leaflets may include an outer wall connected to the second chamber wall, first and second side walls projecting away from the second chamber wall, and a curved inner wall opposite the outer wall. The curved inner walls of the second valve leaflets may form a second aperture configured to pass air out of the second chamber at the third rate when the second valve is in a closed position.

According to an exemplary embodiment of the present invention, the second impact may be greater than the first impact.

According to an exemplary embodiment of the present invention, the third impact may be greater than the second impact.

According to an exemplary embodiment of the present invention, the second rate may be substantially equal to the fourth rate.

According to an exemplary embodiment of the present invention, the first valve leaflets may form an obtuse angle of less than 180° with the first chamber wall when the first valve leaflets are in a closed state. According to an exemplary embodiment of the present invention, the obtuse angle may be from about 120° to about 160°.

According to an exemplary embodiment of the present invention, the second valve leaflets may form an obtuse angle of less than 180° with the second chamber wall when the second valve leaflets are in a closed state. According to an exemplary embodiment of the present invention, the obtuse angle may be from about 120° to about 160°.

According to an exemplary embodiment of the present invention, the first valve leaflets may form an obtuse angle of less than 130° with the first chamber wall when the first valve leaflets are in an open state. The obtuse angle may be from about 100° to about 120°.

According to an exemplary embodiment of the present invention, the second valve leaflets may form an obtuse angle of less than 130° with the second chamber wall when the second valve leaflets are in an open state. The obtuse angle may be from about 100° to about 120°.

According to an exemplary embodiment of the present invention, at least one first chamber reinstating pillar may be disposed in the first chamber. The first chamber reinstating pillar may be configured to apply a first force to return a compressed first chamber to its original shape.

According to an exemplary embodiment of the present invention, the impact absorbing apparatus may include at least one second chamber reinstating pillar disposed in the second chamber. The second chamber reinstating pillar may be configured to apply a second force to return a compressed second chamber to its original shape.

According to an exemplary embodiment of the present invention, the first force may be smaller than the second force.

According to an exemplary embodiment of the present invention, the at least one first chamber reinstating pillar may be configured to at least partially compress in response to the second impact to decrease an acceleration of the second impact.

According to an exemplary embodiment of the present invention, the at least one second chamber reinstating pillar may be configured to at least partially compress in response to the third impact to decrease an acceleration of the second impact.

According to an exemplary embodiment of the present invention, the connecting pillars may decrease a first acceleration caused by the first impact. The first valve may decrease a second acceleration caused by the second impact. The second valve may decrease a third acceleration caused by the third impact.

An exemplary embodiment of the present invention provides a valve for an impact absorbing apparatus including a plurality of valve leaflets. Each of the valve leaflets includes an outer wall connected to a chamber wall, first and second side walls projecting away from the chamber wall, and a curved inner wall opposite the outer wall. A first side wall of a first valve leaflet of the plurality of valve leaflets may be in direct contact with a second side wall of a second adjacent valve leaflet of the plurality of valve leaflets when the plurality of valve leaflets are in a closed state. When the plurality of valve leaflets is in the closed state, the curved inner walls of the valve leaflets of the plurality of valve leaflets form a first aperture configured to regulate air flow through the first aperture. When the plurality of valve leaflets is in an open state, the curved inner walls of the valve leaflets of the plurality of valve leaflets are separated from each other and form a second aperture larger than the first aperture.

According to an exemplary embodiment of the present invention, the first aperture may be configured to pass air therethrough at a higher rate than the second aperture.

According to an exemplary embodiment of the present invention, the first aperture may have a substantially circular shape.

According to an exemplary embodiment of the present invention, a diameter of the first aperture may be in a range of from about 1 mm to about 20 mm.

According to an exemplary embodiment of the present invention, each of the outer walls of the plurality of valve leaflets may have a curved shape, and the outer walls may form a substantially circular outermost valve diameter.

According to an exemplary embodiment of the present invention, the first aperture may be configured to controllably decompress a chamber in which the plurality of valve leaflets is disposed.

According to an exemplary embodiment of the present invention, the first aperture may pass air bi-directionally.

According to an exemplary embodiment of the present invention, each of the plurality of valve leaflets may form an obtuse angle of less than 180° with the chamber wall when the plurality of valve leaflets is in the closed state.

According to an exemplary embodiment of the present invention, the obtuse angle may be from about 120° to about 160°.

According to an exemplary embodiment of the present invention, each of the plurality of valve leaflets may form an obtuse angle of less than 130° with the chamber wall when the plurality of valve leaflets is in the closed state. The obtuse angle may be from about 100° to about 120°.

BRIEF DESCRIPTION OF THE FIGURES

The above and other features of the present invention will become more apparent by describing in detail exemplary embodiments thereof, with reference to the accompanying drawings, in which:

FIG. 6A illustrates a view into a valve in a closed state along a second direction according to an exemplary embodiment of the present invention.

FIG. 6B illustrates a view into a valve in an open state along a second direction according to an exemplary embodiment of the present invention.

FIG. 9A illustrates an impact absorbing apparatus according to an exemplary embodiment of the present invention.

FIG. 9B illustrates an expanded view of area "D" of FIG. 9A according to an exemplary embodiment of the present invention.

FIG. 9C illustrates an expanded view of area "D" of FIG. 9A according to an exemplary embodiment of the present invention.

DETAILED DESCRIPTION

Figure 1A:
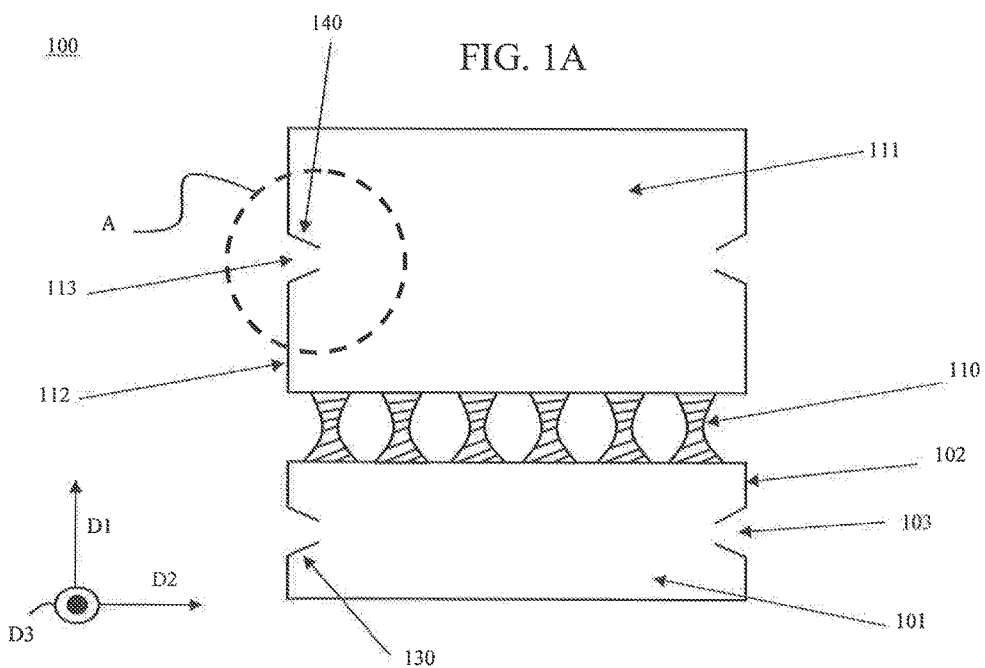
FIG. 1A is a cross-sectional view of an impact absorbing apparatus according to an exemplary embodiment of the present invention.

A concussion is a type of traumatic brain injury that may result from a hit to the head or body, a fall, or another injury that jars or shakes the brain inside the skull. The brain is an unattached organ inside the skull and is separated from the inside of the skull by a relatively thin layer of cerebrospinal fluid. The brain is a relatively delicate organ and a sudden movement, impact, or a sufficient acceleration can result in the brain sliding back and forth or rotating within the skull, which can cause damage to various superficial and relatively deep anatomical regions of the brain.

Acceleration is a change in velocity over a period of time. A substantial force (e.g., resulting from a rapid acceleration), even in the absence of direct and visible impact to the head, can cause a concussion. For example, trauma can occur as a result of a rapid change in the head's velocity or change in vector speed over time. Thus, by reducing a rate of acceleration (e.g., by spreading absorption of an impact over a longer period of time) by using an impact absorbing apparatus, a rate of occurrence and severity of concussions may be substantially mitigated or eliminated. For example, research has shown that reducing linear and/or rotational acceleration of the head can reduce a degree of maximal stress or strain applied to both superficial and relatively deep anatomical regions of the brain.

Exemplary embodiments of the present invention provide an impact absorbing apparatus configured to reduce negative health consequences, such as concussion, traumatic brain injury (TBI) and Chronic Traumatic Encephalopathy (CTE) resulting from a rapid acceleration or an impact to the head, such as may occur in ice hockey, football and cycling. The impact absorbing apparatus may be used in a safety helmet or other safety gear, such as sports padding or a sports helmet.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Exemplary embodiments of the present invention will be described more fully hereinafter with reference to the accompanying drawings. Like reference numerals may refer to like elements throughout the specification and drawings.

FIGS. 1A, 1B, 1C, 2A, 2B, 2C, 3, 4A, 4B, 5, 6A, 6B, 9A, 9B and 9C each include a compass indicating a first direction D1, a second direction D2 and a third direction D3. In each of FIGS. 1A, 1B, 1C, 2A, 2B, 2C, 3, 4A, 4B, 5, 6A, 6B, 9A, 9B and 9C, one of the first, second and third directions D1, D2 and D3 indicates an up or down direction, a second of the first, second and third directions D1, D2 and D3 indicates a right or left direction, and a third of the first, second and third directions D1, D2 and D3 indicates a direction into or out of the plane of the page.

Figure 1B:
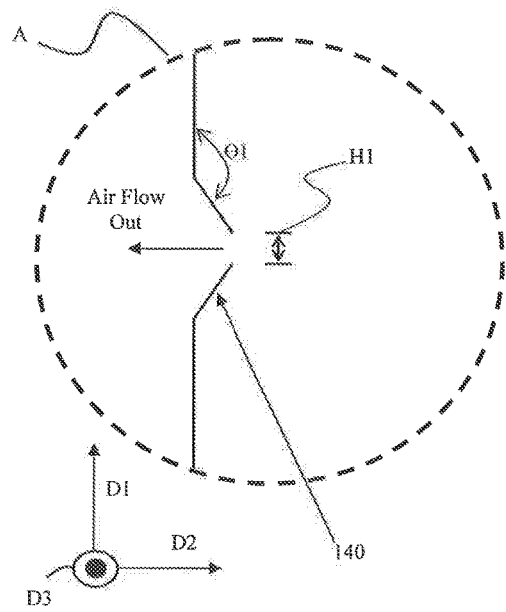
FIG. 1B illustrates an expanded view of area "A" of FIG. 1A when a valve is in a closed state according to an exemplary embodiment of the present invention.
Figure 1C:
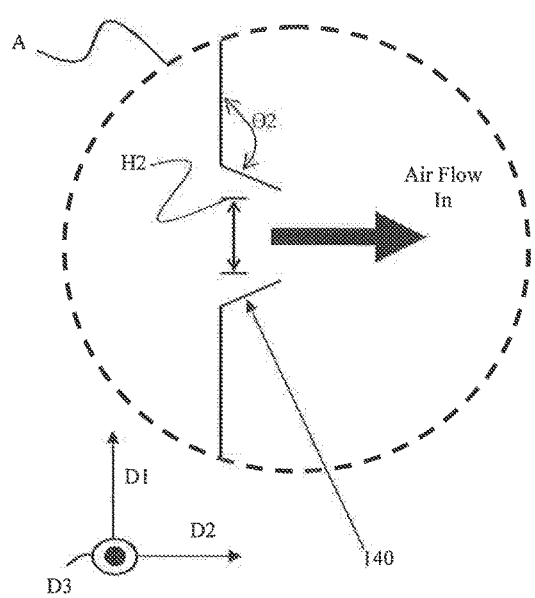
FIG. 1C illustrates an expanded view of area "A" of FIG. 1A when a valve is in an open state according to an exemplary embodiment of the present invention.

FIG. 1A is a cross-sectional view of an impact absorbing apparatus according to an exemplary embodiment of the present invention. FIG. 1B illustrates an expanded view of area "A" of FIG. 1A when a valve is in a closed state according to an exemplary embodiment of the present invention. FIG. 1C illustrates an expanded view of area "A" of FIG. 1A when a valve is in an open state according to an exemplary embodiment of the present invention.

Figure 4A:
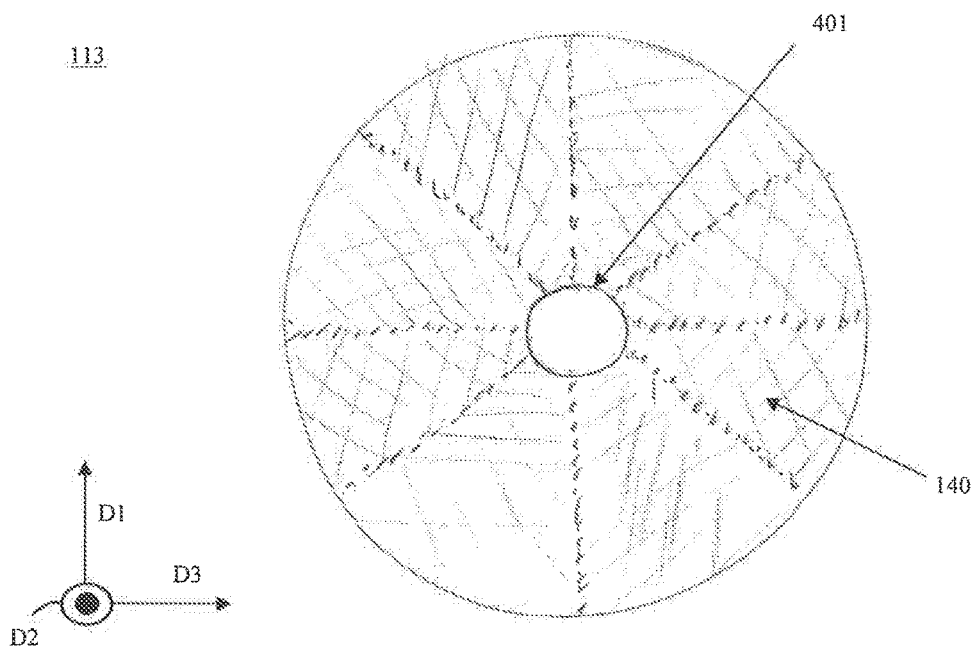
FIG. 4A illustrates a view into a valve in a closed state along a second direction according to an exemplary embodiment of the present invention.
Figure 4B:
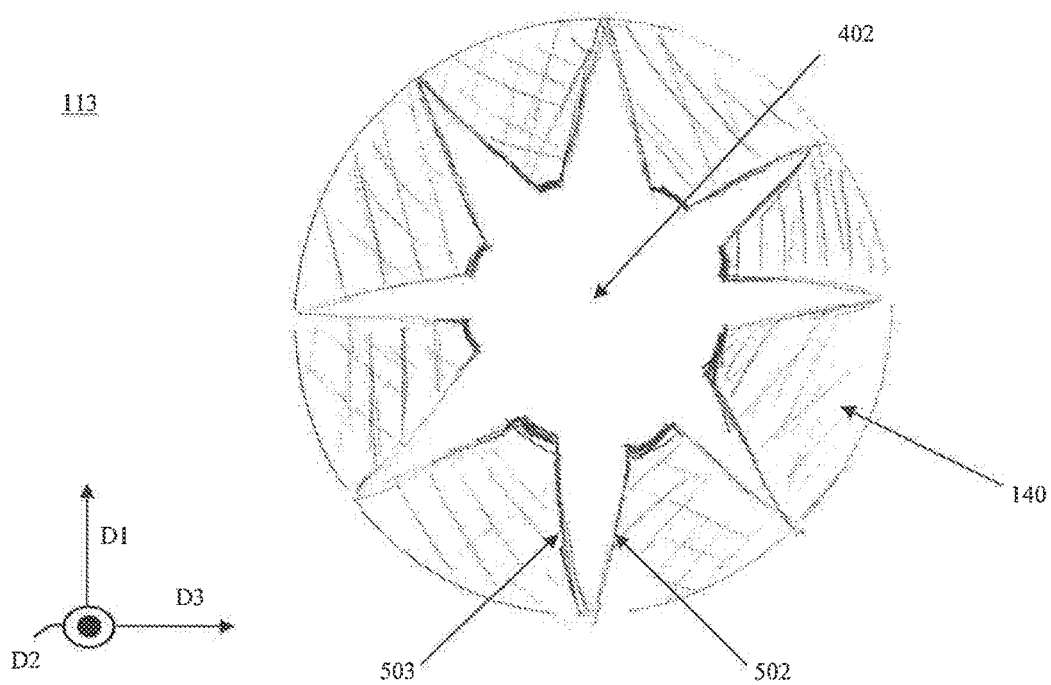
FIG. 4B illustrates a view into a valve in an open state along a second direction according to an exemplary embodiment of the present invention.

Referring to FIGS. 1A, 1B and 1C, an exemplary embodiment of the present invention provides an impact absorbing apparatus 100 including a first chamber 101 having a first chamber wall 102 and a first valve 103 disposed in the first chamber wall 102. The first valve 103 is configured to pass air out of the first chamber 101 at a first rate when the first valve 103 is in a closed state (see, e.g., FIG. 4A illustrating a valve in a closed state). The first valve 103 is configured to pass air into the first chamber 101 at a second rate when the first chamber 101 is in an open state (see, e.g., FIG. 4B illustrating a valve in an open state). The second rate is faster than the first rate. The impact absorbing apparatus 100 includes a second chamber 111 having a second chamber wall 112 and a second valve 113 disposed in the second chamber wall 112. The second valve 113 is configured to pass air out of the second chamber 111 at a third rate when the second valve 113 is in a closed state. The second valve 113 is configured to pass air into the second chamber 111 at a fourth rate when the second valve 113 is in an open state. The fourth rate is faster than the third rate. A plurality of connecting pillars 110 connects the first chamber 101 to the second chamber 111. The plurality of connecting pillars 110 is configured to shift position in response to a first impact. The first valve 103 is configured to pass air out of the first chamber 101 at the first rate in response to a second impact. The second valve 113 is configured to pass air out of the second chamber 111 at the third rate in response to a third impact.

According to an exemplary embodiment of the present invention, the second impact described above may be greater than the first impact, and the third impact described above may be greater than the second impact. According to an exemplary embodiment of the present invention, the second rate may be substantially equal to the fourth rate. Compression of the connecting pillars 110, the first chamber 101 and the second chamber 111 in response to the first impact, the second impact and the third impact, respectively, will be described in more detail below with reference, for example, to FIG. 3.

The first valve 103 may have substantially a same configuration as the second valve 113, with the exception of sizes of first and second air exit apertures 401 formed by the first valve 103 and the second valve 113 and/or sizes of first and second air entrance apertures 402 formed by the first valve 103 and the second valve 113. Aperture sizes are discussed in more detail below with reference, for example, to FIGS. 4A and 4B. Generally, with the exception of possibly having different aperture sizes, a description of one of the first valve 103 or the second valve 113 herein may similarly apply to the other of the first valve 103 or the second valve 113 according to exemplary embodiments of the present invention.

According to an exemplary embodiment of the present invention, the first chamber 101 and/or the second chamber 111 may be returned to their original shape relatively rapidly after being compressed due to an impact. For example, the first chamber 101 and/or the second chamber 111 may be returned to their original shape within about 100 ms to about 1,500 ms (e.g., within 100-500 ms). A relatively large aperture size formed by the first valve 103 and/or the second valve 104 in an open state, as discussed below in more detail, may allow air to flow back into the first chamber 101 and/or the second chamber 111, respectively, in a substantially unobstructed manner, and thus reinstating an original shape of the first chamber 101 and/or the second chamber 111 may occur relatively rapidly. As an example, the chamber wall 102 of the first chamber 101 and/or the chamber wall 112 of the second chamber 111 may each include at least one polymer (e.g., an elastomer) configured to relatively rapidly return to its original shape.

An elastomer refers to a natural or synthetic polymer having elastic properties. Elastomers may display viscoelasticity (e.g., may have both viscosity and elasticity), and may have relatively weak inter-molecular forces. Elastomers may have a relatively low Young's modulus. A rapidly expanding elastomer configured to rapidly reinstate its original shape may have relatively high elastic properties. An elastomer included in the chamber wall 102 of the first chamber 101 and/or the chamber wall 112 of the second chamber 111 may be selected based on a desired rate of return to the elastomers original shape. Non-limiting examples of elastomers may include Natural polyisoprene: cis-1,4-polyisoprene natural rubber (NR) and trans-1,4-polyisoprene gutta-percha; Synthetic polyisoprene (IR for isoprene rubber); Polybutadiene (BR for butadiene rubber); or Chloroprene rubber (CR).

Figure 2A:
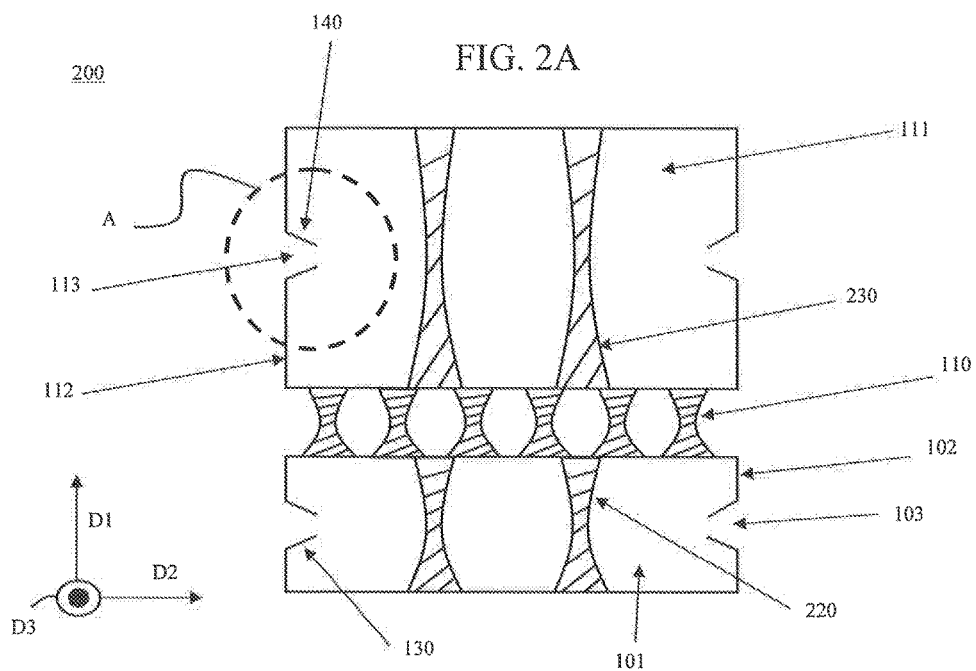
FIG. 2A is a cross-sectional view of an impact absorbing apparatus according to an exemplary embodiment of the present invention.
Figure 2B:
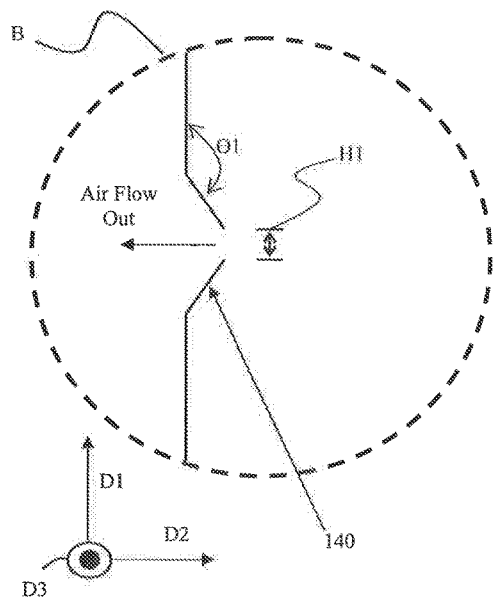
FIG. 2B illustrates an expanded view of area "B" of FIG. 2A when a valve is in a closed state according to an exemplary embodiment of the present invention.
Figure 2C:
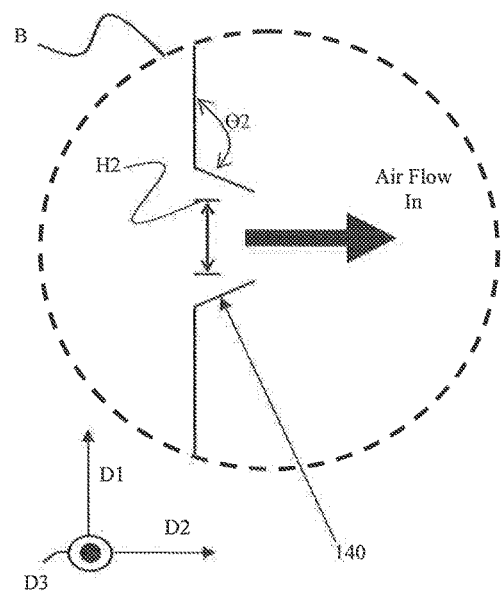
FIG. 2C illustrates an expanded view of area "B" of FIG. 2A when a valve is in an open state according to an exemplary embodiment of the present invention.

FIG. 2A is a cross-sectional view of an impact absorbing apparatus according to an exemplary embodiment of the present invention. FIG. 2B illustrates an expanded view of area "B" of FIG. 2A when a valve is in a closed state according to an exemplary embodiment of the present invention. FIG. 2C illustrates an expanded view of area "B" of FIG. 2A when a valve is in an open state according to an exemplary embodiment of the present invention.

An impact absorbing apparatus 200 described with reference to FIG. 2A, FIG. 2B and FIG. 2C, for example, may be substantially the same as the impact absorbing apparatus 100, with the exception of a first chamber reinstating pillar 220 and/or a second chamber reinstating pillar 230. Thus, features described with reference to the impact absorbing apparatus 100 may similarly be included in the impact absorbing apparatus 200, and duplicative descriptions may be omitted.

Referring to FIG. 2A, FIG. 2B and FIG. 2C, according to an exemplary embodiment of the present invention, at least one first chamber reinstating pillar 220 may be disposed in the first chamber 101. The first chamber reinstating pillar 220 may be configured to apply a first force to return a compressed first chamber 101 to its original shape.

According to an exemplary embodiment of the present invention, the impact absorbing apparatus 200 may include at least one second chamber reinstating pillar 230 disposed in the second chamber 111. The second chamber reinstating pillar 230 may be configured to apply a second force to return a compressed second chamber 111 to its original shape.

According to an exemplary embodiment of the present invention, the first force applied to the first chamber 101 may be smaller than the second force applied to the second chamber 111.

A number of chamber reinstating pillars according to an exemplary embodiment of the present invention is not limited to a particular number of pillars, and the number of pillars may be adjusted, as desired. For example, additional chamber reinstating pillars may be included in a larger chamber, or to increase a rate at which an original shape of a particular chamber is reinstated.

According to an exemplary embodiment of the present invention, the first chamber 101 and/or the second chamber 111 may be returned to their original shape relatively rapidly after being compressed due to an impact. For example, the first chamber 101 and/or the second chamber 111 may be returned to their original shape within about 100 ms to about 1,500 ms (e.g., within 100-500 ms). A relatively large aperture size formed by the first valve 103 and/or the second valve 104 in an open state, as discussed below in more detail, may allow air to flow back into the first chamber 101 and/or the second chamber 111, respectively, in a substantially unobstructed manner, and thus reinstating an original shape of the first chamber 101 and/or the second chamber 111 may occur relatively rapidly. As an example, the at least one first chamber reinstating pillar 220 and/or the at least one second chamber reinstating pillar 230 may each apply a force to the first chamber 101 and/or the second chamber 111, respectively, which may increase a rate at which an original shape of the first chamber 101 and/or the second chamber 111 is reinstated.

According to an exemplary embodiment of the present invention, the at least one first chamber reinstating pillar 220 may be configured to at least partially compress in response to the second impact to decrease an acceleration of the second impact.

According to an exemplary embodiment of the present invention, the at least one second chamber reinstating pillar 230 may be configured to at least partially compress in response to the third impact to decrease an acceleration of the second impact.

As an example, the at least one first chamber reinstating pillar 220 and/or the at least one second chamber reinstating pillar 230 may each include at least one polymer (e.g., an elastomer) configured to relatively rapidly return to its original shape and/or to apply a force to the chamber wall 102 of the first chamber 101 and/or the chamber wall 112 of the second chamber 111, respectively.

An elastomer refers to a natural or synthetic polymer having elastic properties. Elastomers may display viscoelasticity (e.g., may have both viscosity and elasticity), and may have relatively weak inter-molecular forces. Elastomers may have a relatively low Young's modulus. A rapidly expanding elastomer configured to rapidly reinstate its original shape may have relatively high elastic properties. An elastomer included in the at least one first chamber reinstating pillar 220 and/or the at least one second chamber reinstating pillar 230 may be selected based on a desired rate of return to the elastomers original shape. Non-limiting examples of elastomers may include Natural polyisoprene: cis-1,4-polyisoprene natural rubber (NR) and trans-1,4-polyisoprene guttapercha; Synthetic polyisoprene (IR for isoprene rubber); Polybutadiene (BR for butadiene rubber); or Chloroprene rubber (CR).

Figure 5:
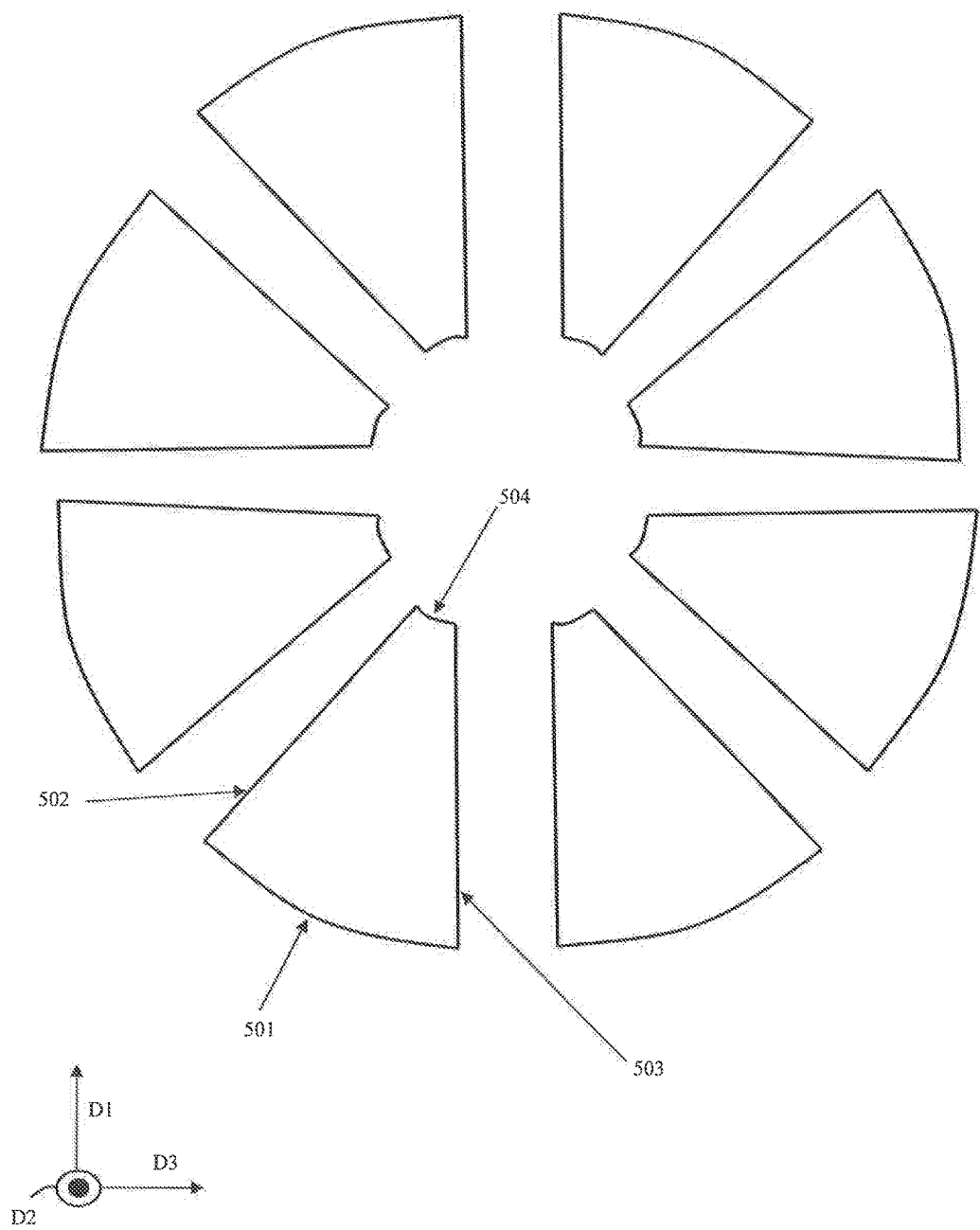
FIG. 5 illustrates an exploded view of a plurality of valve leaflets of a valve according to an exemplary embodiment of the present invention.

FIG. 4A illustrates a view into a valve in a closed state along a second direction according to an exemplary embodiment of the present invention. FIG. 4B illustrates a view into a valve in an open state along a second direction according to an exemplary embodiment of the present invention. FIG. 5 illustrates an exploded view of a plurality of valve leaflets of a valve according to an exemplary embodiment of the present invention.

Referring to FIG. 1A, FIG. 1B, FIG. 1C, FIG. 4A, FIG. 4B and FIG. 5, according to an exemplary embodiment of the present invention, the first valve 103 may include a plurality of first valve leaflets 130. Each of the first valve leaflets 130 may include an outer wall 501 connected to the first chamber wall 102, first and second side walls 502 and 503 projecting away from the first chamber wall 102, and a curved inner wall 504 opposite the outer wall 501. The curved inner walls 504 of the first valve leaflets 130 may form a first air exit aperture 401 configured to pass air out of the first chamber 101 at the first rate when the first valve 103 is in a closed state.

According to an exemplary embodiment of the present invention, the second valve 113 may include a plurality of second valve leaflets 140. Each of the second valve leaflets 140 may include the outer wall 501 connected to the second chamber wall 112, first and second side walls 502 and 503 projecting away from the second chamber wall 112, and the curved inner wall 504 opposite the outer wall. The curved inner walls 504 of the second valve leaflets 140 may form a second air exit aperture 401 configured to pass air out of the second chamber 111 at the third rate when the second valve 113 is in a closed state.

The first valve 103 (including the first valve leaflets 130) may have substantially a same configuration as the second valve 113 (including the second valve leaflets 140), with the exception of sizes of first and second air exit apertures 401 formed by the first valve 103 and the second valve 113, respectively; and/or sizes of first and second air entrance apertures 402 formed by the first valve 103 and the second valve 113, respectively. Thus, an opening and closing of only the second valve 113 will be described in more detail below regarding the formation of the air exit aperture 401 and the air entrance aperture 402. However, the first valve 103 will be understood to open and close in substantially the same way as the second valve 113 to form a corresponding air exit aperture 401 and air entrance aperture 402 of the first valve 103.

According to an exemplary embodiment of the present invention, each of the valve leaflets (e.g., the second valve leaflets 140) may form a first obtuse angle (e.g., $\Theta 1$) with the chamber wall (e.g., the second chamber wall 112) when the impact absorbing apparatus (e.g., the impact absorbing apparatus 100) is in an inflated state, and has not recently experienced an impact. That is, the valve (e.g., the second valve 113) may be in the closed state (e.g., may have a first diameter H1—see, e.g., FIG. 1B, FIG. 2B and FIG. 4A) when the impact absorbing apparatus has not experienced a recent impact and the valve leaflets may project slightly away from the chamber wall toward an inside of the chamber while being positioned to form the air exit aperture 401. The air exit aperture 401 is formed by the curved inner walls 504 of the plurality of valve leaflets when the valve is in the closed state. That is, even in the closed state, the air exit aperture 401 will controllably allow air to exit the chamber in response to an impact, while controlling the rate at which the air exits the chamber. A diameter of the air exit aperture 401 may be adjusted to increase or decrease a flow rate of air exiting the chamber. In the closed state, side walls of each of the valve leaflets may be in direct contact with each other and may create an air tight seal, with the exception of the air exit aperture 401. One or more impacts to the impact absorbing apparatus may then apply a force to an outside of the impact absorbing apparatus, which may cause air to be forced through the exit aperture 401 at a desired flow rate to absorb an impact, reduce a rate of acceleration and therefore reduce an amount of force applied to an object in contact with the impact absorbing apparatus.

During the impact to the impact absorbing apparatus, the chamber may compress and an area inside the chamber may become smaller as air exits the chamber through the air exit aperture 401. A material (e.g., an elastomer) included in the chamber wall may cause the chamber to relatively rapidly return to its original shape when the impact is over, thus pulling air back into the chamber to refill the chamber. The air returning into the chamber may pass through the air entrance aperture 402, which may cause the valve to expand into the open state (see, e.g., FIG. 1C, FIG. 2C and FIG. 4B). The open valve may have a second diameter (e.g., a second diameter H2 which is larger than the first diameter H1). The open valve may form a second obtuse angle (e.g., Θ2) that is smaller than the first obtuse angle (e.g., Θ1) with respect to the side wall of the chamber. Thus, air may be pulled back into the chamber relatively rapidly and the chamber may return to its original shape (e.g., within about 100 ms to about 1,500 ms).

According to an exemplary embodiment of the present invention, the connecting pillars 110 may decrease a first acceleration caused by the first impact. The first valve 101 may decrease a second acceleration caused by the second impact. The second valve 111 may decrease a third acceleration caused by the third impact.

According to an exemplary embodiment of the present invention, the valve (e.g., the second valve 113) may form an obtuse angle with the chamber wall (e.g., the second chamber wall 112) and may face into the chamber. The obtuse angle may allow the air exit aperture 401 to sustain substantial air exit pressure without bending toward an outside of the chamber, and without being forced to expand beyond a desired size of the air exit aperture 401.

According to an exemplary embodiment of the present invention, the first valve leaflets 130 may form an obtuse angle of less than 180° with an inside of the first chamber wall 102 when the first valve leaflets 130 are in a closed state. According to an exemplary embodiment of the present invention, the obtuse angle may be from about 120° to about 160°.

According to an exemplary embodiment of the present invention, the second valve leaflets 140 may form an obtuse angle of less than 180° with an inside of the second chamber wall 112 when the second valve leaflets 140 are in a closed state. According to an exemplary embodiment of the present invention, the obtuse angle may be from about 120° to about 160°.

According to an exemplary embodiment of the present invention, the first valve leaflets 130 may form an obtuse angle of less than 130° with an inside of the first chamber wall 102 when the first valve leaflets 130 are in an open state. The obtuse angle may be from about 100° to about 120°.

According to an exemplary embodiment of the present invention, the second valve leaflets 140 may form an obtuse angle of less than 130° with an inside of the second chamber wall 112 when the second valve leaflets 140 are in an open state. The obtuse angle may be from about 100° to about 120°.

According to an exemplary embodiment of the present invention, a diameter of the air exit aperture 401 may be in a range of from about 1 mm to about 20 mm. However, exemplary embodiments of the present invention are not limited thereto, and other diameters may be employed, as desired.

According to an exemplary embodiment of the present invention, the first chamber 101 may have a different internal volume, (e.g., may have a different size) than the second chamber 111. Thus, an amount of air in the first and second chambers 101 and 111 may be different from each other.

The air exit aperture 401 of the first valve 103 may have a same or a different diameter than the air exit aperture 401 of the second valve 113. The air entrance aperture 402 of the first valve 103 may have a same or a different diameter than the air entrance aperture 402 of the second valve 113. As an example, the air exit aperture 401 of the first valve 103 may have a different diameter than the air exit aperture 401 of the second valve 113, which may allow air to exit the first and second chambers 101 and 111 at different rates, respectively. Thus, a compression rate of the first and second chambers 101 and 111 may be different from each other.

As an example, the air exit aperture 401 of the first valve 103 may have a different diameter than the air exit aperture 401 of the second valve 113, while the air entrance apertures 403 of each of the first and second chambers 101 and 111 may be substantially the same as each other. Thus, each of the first and second chambers 101 and 111 may be configured to absorb a different level of impact, while refill rates of each of the first and second chambers 101 and 111 may be substantially the same as each other.

As an example, the air exit aperture 401 of the first valve 103 may have substantially a same diameter as the air exit aperture 401 of the second valve 113, and the air entrance apertures 403 of each of the first and second chambers 101 and 111 may be substantially the same as each other. Thus, an air exit rate of each of the first and second chambers 101 and 111 may be substantially the same as each other, and refill rates of each of the first and second chambers 101 and 111 may be substantially the same as each other.

As an example, the air exit aperture 401 of the first valve 103 may have a different diameter than the air exit aperture 401 of the second valve 113, and the air entrance apertures 403 of each of the first and second chambers 101 and 111 may be different from each other. Thus, an air exit rate and an air entrance rate between the first and second chambers 101 and 111 may be different from each other.

As an example, the air exit aperture 401 of the first valve 103 may have substantially a same diameter as the air exit aperture 401 of the second valve 113, while the air entrance apertures 403 of each of the first and second chambers 101 and 111 may be different from each other.

According to an exemplary embodiment of the present invention, the volumes of the first and second chambers 101 and 111 may be varied, as desired. For example, if the air exit rates of the first and second chambers 101 and 111 are substantially the same as each other, but a volume of air in the chamber is different, than it may take longer for a larger volume of air to exit the relatively larger chamber, which may increase a time period over which an acceleration is absorbed. The amount of air in each chamber, and flow rates in and out of each chamber may be adjusted, as desired to increase or decrease deflation or inflation times of the first and second chambers.

According to an exemplary embodiment of the present invention, shapes of the first and second chambers 101 and 111 may vary. For example, the first and second chambers 101 and 111 may each have substantially circular or oval shapes, or may have substantially square or rectangular shapes. However, exemplary embodiments of the present invention are not limited thereto, and various shapes may be employed, as desired. For example, shapes of the first and second chambers 101 and 111 may be selected according to a helmet or safety gear in which the impact absorbing apparatus is employed.

Figure 3:
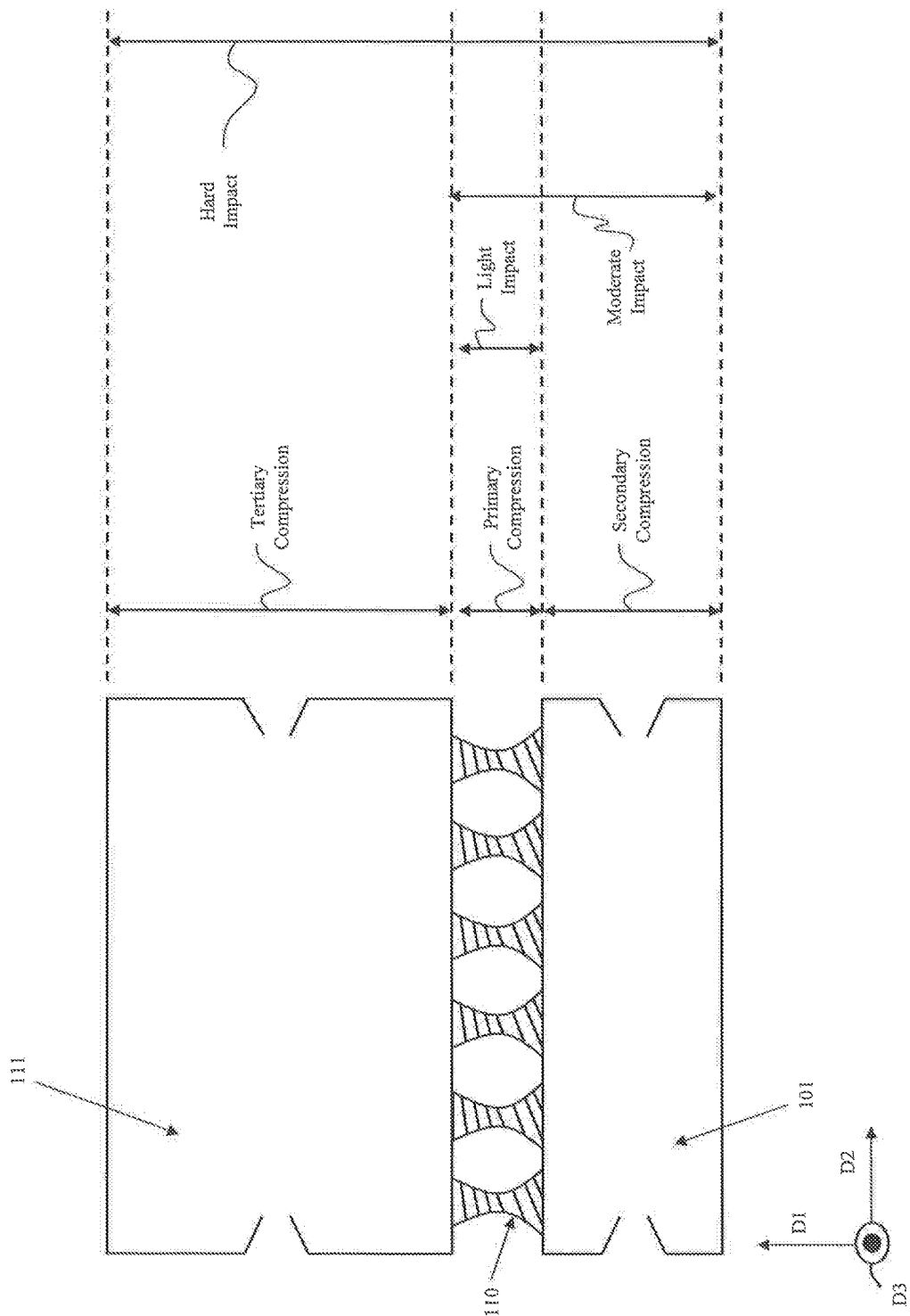
FIG. 3 illustrates light, moderate and hard impact compression of an impact absorbing apparatus according to an exemplary embodiment of the present invention.

FIG. 3 illustrates light, moderate and hard impact compression of an impact absorbing apparatus according to an exemplary embodiment of the present invention.

According to an exemplary embodiment of the present invention, the connecting pillars 110 may compress in response to a relatively light impact, which may decrease a first acceleration caused by the relatively light impact. As an example, the first compression may be a primary compression in which only the connecting pillars 110 compresses, and neither of the first and second chambers 101 and 111 compresses.

According to an exemplary embodiment of the present invention, the connecting pillars 110 may be configured to compress along the first direction D1, the second direction D2 and/or the third direction D3. That is, the connecting pillars 110 may shift in any direction. For example, the connecting pillars 110 may allow the first chamber 101 to rotate slightly with respect to the second chamber 111, and/or the connecting pillars may compress along the first direction D1 when the first chamber 101 and/or the second chamber 111 is impacted.

According to an exemplary embodiment of the present invention, the connecting pillars 110 and the first chamber 101 may compress in response to a relatively moderate impact, which may decrease a second acceleration caused by the relatively moderate impact. As an example, the second compression may be a secondary compression in which both the connecting pillars 110 and the first chamber 101 are compressed, while the second chamber 111 is not compressed.

According to an exemplary embodiment of the present invention, the connecting pillars 110, the first chamber 101 and the second chamber 111 may compress in response to a relatively hard impact, which may decrease a third acceleration caused by the relatively hard impact. As an example, the third compression may be a tertiary compression in which each of the connecting pillars 110, the first chamber 101 and the second chamber 111 are compressed to absorb the relatively hard impact.

As an example, a relatively light impact may refer to an impact of about 3 m/s (approximately 6.7 MPH), a relatively moderate impact may refer to an impact of about 5 m/s (approximately 11.2 MPH) and a relatively hard impact may refer to an impact of about 7 m/s (approximately 15.7 MPH). However, exemplary embodiments of the present invention are not limited thereto, and the impact absorbing apparatus may be configured to absorb any desired range of impacts.

For example, the impact absorbing apparatus described herein may be configured to absorb a range of intensity of impacts.

As an example, the tertiary compression (e.g., a relatively hard impact) may be an initial impact that occurs without the occurrence of primary or secondary compressions. Thus, only a hard impact might be experienced in the absence of light or moderate impacts.

FIG. 6A illustrates a view into a valve in a closed state along a second direction according to an exemplary embodiment of the present invention. FIG. 6B illustrates a view into a valve in an open state along a second direction according to an exemplary embodiment of the present invention.

Referring to FIG. 6A and FIG. 6B, an exemplary embodiment of the present invention provides a valve 600 for an impact absorbing apparatus including a plurality of valve leaflets 140. Each of the valve leaflets 140 includes the outer wall 501 connected to a valve wall 601, first and second side walls 502 and 503 projecting away from the valve wall 601, and a curved inner wall 504 opposite the outer wall 501. A first side wall of a first valve leaflet of the plurality of valve leaflets may be in direct contact with a second side wall of a second adjacent valve leaflet of the plurality of valve leaflets when the plurality of valve leaflets are in a closed state (see, e.g., FIG. 4A and FIG. 6A illustrating closed valves forming the air exit aperture 401). When the plurality of valve leaflets 140 is in the closed state, the curved inner walls 504 of the valve leaflets of the plurality of valve leaflets 140 form a first aperture (e.g., the air exit aperture 401) configured to regulate air flow through the first aperture. When the plurality of valve leaflets 140 is in an open state, the curved inner walls 504 of the valve leaflets of the plurality of valve leaflets 140 are separated from each other and form a second aperture (e.g., the air entrance aperture 402) larger than the first aperture.

According to an exemplary embodiment of the present invention, the first aperture may be configured to pass air therethrough at a slower rate than the second aperture.

According to an exemplary embodiment of the present invention, the first aperture may have a substantially circular shape. However, exemplary embodiments of the present invention are not limited thereto, and other shapes may be employed, as desired.

According to an exemplary embodiment of the present invention, a diameter of the first aperture may be in a range of from about 1 mm to about 20 mm. However, exemplary embodiments of the present invention are not limited thereto, and other diameters may be employed, as desired.

According to an exemplary embodiment of the present invention, each of the outer walls 501 of the plurality of valve leaflets 140 may have a curved shape, and the outer walls 501 may form a substantially circular outermost valve diameter.

According to an exemplary embodiment of the present invention, the first aperture may be configured to controllably decompress a chamber in which the plurality of valve leaflets 140 is disposed, as described in more detail above.

According to an exemplary embodiment of the present invention, the first aperture may pass air bi-directionally. For example, air may enter into the chamber through the air exit aperture when the chamber is in an uncompressed state. This may occur, for example, to equilibrate the chamber as a result of changing barometric pressure or changes in altitude.

According to an exemplary embodiment of the present invention, each of the plurality of valve leaflets may form an obtuse angle of less than 180° with an inside of the chamber wall when the plurality of valve leaflets is in the closed state. For example, the obtuse angle may be from about 120° to about 160°.

According to an exemplary embodiment of the present invention, each of the plurality of valve leaflets may form an obtuse angle of less than 130° with an inside of the chamber wall when the plurality of valve leaflets is in the closed state. The obtuse angle may be from about 100° to about 120°. Thus, a diameter of the air exit aperture 401 may be smaller than a diameter of the air entrance aperture 402.

According to an exemplary embodiment of the present invention, the configuration of the valve leaflets allowing air flow in (see, e.g., FIG. 1B) and air flow out (see, e.g., FIG. 1C) may be embodied in two separate valves. For example, a first valve may be dimensioned and shaped, as described herein, to allow air flow in at a first rate, while a second separately positioned valve may be dimensioned and shaped, as described herein, to allow air flow out at a second rate different from the first rate.

According to an exemplary embodiment of the present invention, the connecting pillars 110 may be omitted and the first and second chambers 101 and 111 may be in direct contact with each other.

The shape of the connecting pillars 110 as described herein is not limited to a particular shape, and the shape of the connecting pillars 110 may be modified, as desired.

Figure 7:
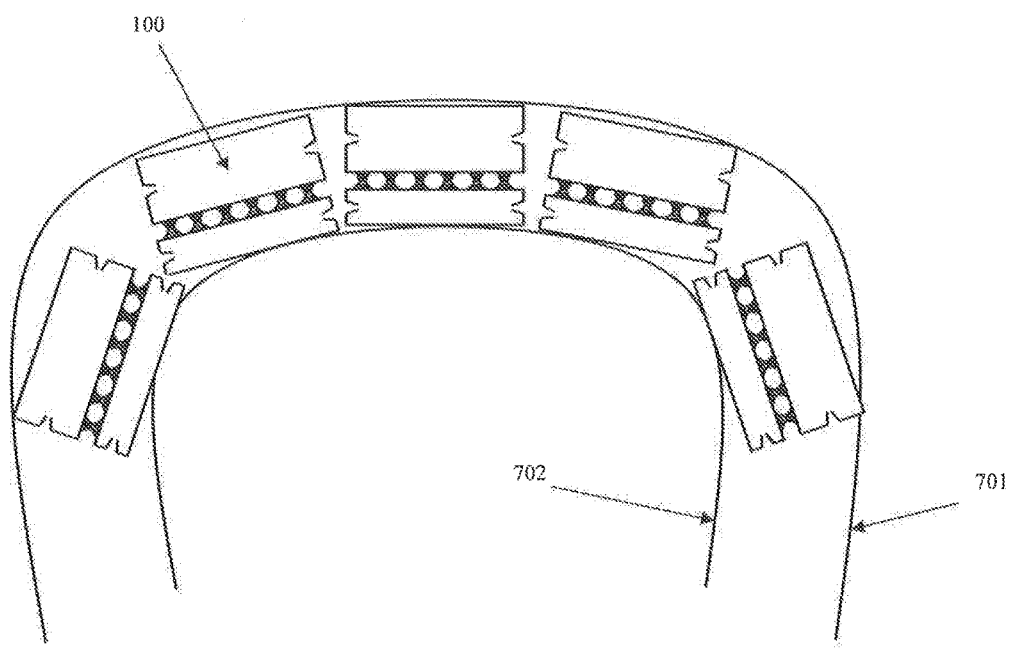
FIG. 7 illustrates a helmet including a plurality of impact absorbing apparatuses according to an exemplary embodiment of the present invention.

FIG. 7 illustrates a helmet including a plurality of impact absorbing apparatuses according to an exemplary embodiment of the present invention.

Referring to FIG. 7, a helmet 700 may include a plurality of impact absorbing apparatuses (e.g., the impact absorbing apparatuses 100). The helmet 700 may be a sports helmet, such as a hockey helmet or a football helmet. The impact absorbing apparatuses may be disposed between an inner helmet wall 702 and an outer helmet wall 701. The outer helmet wall 701 may included a substantially rigid material having a relatively smooth outer surface. The inner helmet wall 702 may include a less rigid material. The inner helmet wall 702 may include a liner configured to contact a user's head and to support the helmet on the user's head.

The plurality of impact absorbing apparatuses may be connected to the inner helmet wall 702 and/or the outer helmet wall 701, or may be wedged between the inner helmet wall 702 and/or the outer helmet wall 701 to hold the plurality of impact absorbing apparatuses in a desired position (e.g., in a position likely to experience an external impact).

The outer helmet wall 701 may include carbon fiber or a carbon fiber blend configured to be relatively light and relatively rigid when exposed to an external impact. The outer helmet wall 701 may additionally include Kevlar.

According to an exemplary embodiment of the present invention, the impact absorbing apparatus (e.g., the impact absorbing apparatus 100) may be used in safety padding, such as safety padding for sports equipment. The impact absorbing apparatus may be configured, as described above in more detail, to absorb the degree and severity of impacts experienced by such safety padding. For example, the impact absorbing apparatus may be included in safety gloves or leg padding worn by hockey or football players.

Figure 8A:
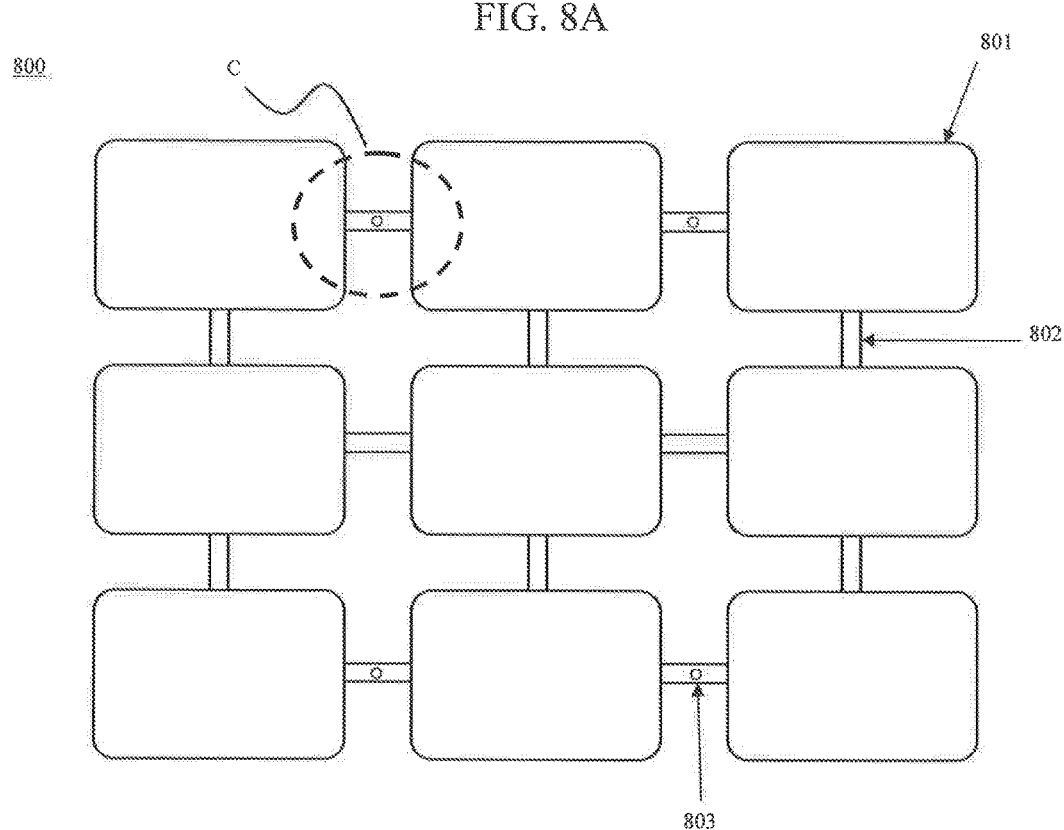
FIG. 8A illustrates an impact absorbing apparatus according to an exemplary embodiment of the present invention.
Figure 8B:
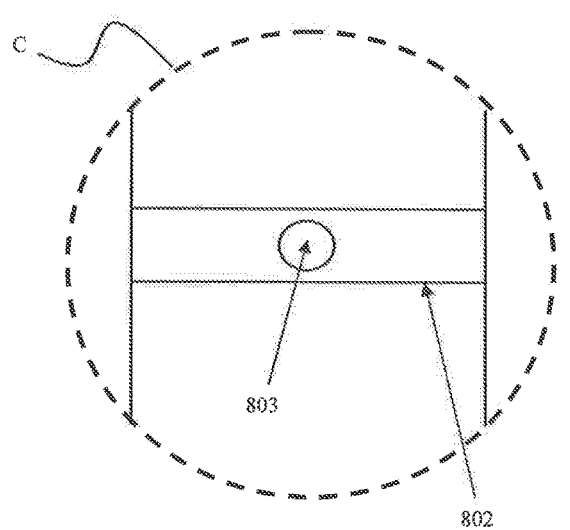
FIG. 8B illustrates an expanded view of area "C" of FIG. 8A according to an exemplary embodiment of the present invention.

FIG. 8A illustrates an impact absorbing apparatus according to an exemplary embodiment of the present invention. FIG. 8B illustrates an expanded view of area "C" of FIG. 8A according to an exemplary embodiment of the present invention.

Referring to FIG. 8A and FIG. 8B, an energy absorbing apparatus 800 may include a plurality of chambers 801. The plurality of chambers 801 may be interconnected to form a closed system having an internal pressure. The closed system may be filled with air or one or more liquids. The interconnected plurality of chambers 801 may be connected to each other by a plurality of connection tubes 802.

Generally, the internal pressure in an air-filled closed system may vary according to a pressure (e.g., a barometric pressure) outside the air-filled system. For example, the pressure outside the air filled system may vary by altitude, and thus the internal pressure may vary as the closed system is positioned at different altitudes. Thus, an impact absorbing capability of the air-filled closed system may vary at different altitudes or at different barometric pressures, or if air unexpectedly exits the closed-system.

In the energy absorbing apparatus 800 according to an exemplary embodiment of the present invention, at least one ambient air valve 803 may be disposed in at least one of the plurality of connection tubes 802. While the at least one ambient air valve 803 may be disposed in at least one of the plurality of connection tubes 802, exemplary embodiments of the present invention are not limited thereto, and the ambient air valve 803 may be positioned anywhere in the energy absorbing apparatus 800. For example, at least one ambient air valve 803 may be positioned in a side wall of at least one chamber 801.

In the energy absorbing apparatus 800 according to an exemplary embodiment of the present invention, each ambient air valve 803 may controllably allow an exchange of ambient air into or out of the impact absorbing apparatus 800. Thus, a desired internal pressure in the impact absorbing apparatus 800 may be maintained by allowing the internal pressure to gradually equilibrate due to air flowing through the at least one ambient air valve 803. While ambient air may flow through at least one ambient air valve 803, the at least one ambient air valve 803 may be dimensioned to pass a relatively slow stream of air so that equilibration occurs relatively slowly.

As an example, the at least one ambient air valve 803 may be a bi-directional valve having a diameter of from about 0.5 mm to 5 mm, for example from about 0.5 mm to about 2 mm. Thus, pressure equilibration may occur without a reduction in the impact absorbing capability of the impact absorbing apparatus 800.

While on impact, air in the chambers 801 will still flow between the plurality of chambers 801 without any air exiting the closed system, ambient air may be able to gradually equilibrate the closed system, or excess internal air may be able to exit the closed system. As an example, the at least one ambient air valve 803 may be configured to not pass air out of the system during an impact to one or more of the chambers 801.

The chambers 801 and the connection tubes 802 may each include one or more polymers (e.g., elastomers), as discussed above in more detail. The at least one ambient air valve 803 may include a plurality of valve leaflets, and may form one or more apertures of different sizes, as discussed above in more detail.

An energy-absorbing apparatus including a closed air-fluid system having a plurality of chambers is described in U.S. Pat. No. 4,375,108 to Gooding, the disclosure of which is incorporated by reference herein in its entirety. An energy-absorbing apparatus including a closed air-fluid system having a plurality of chambers is described in U.S. Pat. No. 4,566,137 to Gooding, the disclosure of which is incorporated by reference herein in its entirety.

FIG. 9A illustrates an impact absorbing apparatus according to an exemplary embodiment of the present invention.

FIG. 9B illustrates an expanded view of area "D" of FIG. 9A according to an exemplary embodiment of the present invention. FIG. 9C illustrates an expanded view of area "D" of FIG. 9A according to an exemplary embodiment of the present invention.

Referring to FIG. 9A, FIG. 9B and FIG. 9C, an impact absorbing apparatus 900 may include a chamber 901 and a bi-directional valve 902 disposed in at least one side wall of the chamber 901. The bi-directional valve 902 may include a first end 903 having a first diameter and a second end 904 having a second diameter greater than the first diameter. The bi-directional valve 902 may project away from an inside of the chamber 901.

According to an exemplary embodiment of the present invention, the relatively wider diameter of the second end 904 may allow air to flow into the chamber 901 more quickly than air flows out of the chamber 901. Thus, a refill time of the chamber 901 may be shorter than a decompression time.

According to an exemplary embodiment of the present invention the bi-directional valve 902 may have a syringe or funnel shape in which the resistance of the outgoing air is greater than the resistance as it returns to refill the impact absorbing apparatus 900. As an example, the compression of the impact absorbing apparatus 900 is relatively slow, while its re-expansion is relatively fast. Impact forces applied to the impact absorbing apparatus 900 are attenuated with a gradual "air bag" effect, but the impact absorbing apparatus 900 is refilled with air relatively quickly following each impact, which may return the impact absorbing apparatus 900 to readiness for additional impacts.

The chamber 901 may include one or more polymers (e.g., elastomers), as discussed above in more detail. The bi-directional valve 902 may include a plurality of valve leaflets, and may form one or more apertures of different sizes, as discussed above in more detail.

Having described exemplary embodiments of the present invention, it is further noted that it is readily apparent to those of ordinary skill in the art that various modifications may be made without departing from the spirit and scope of the present invention.

What is claimed is:

1. An impact absorbing apparatus, comprising:
   a first chamber, comprising:
      a first chamber wall, and
      a first valve disposed in the first chamber wall,
         wherein the first valve when in a closed state forms a first aperture configured to pass air out of the first chamber at a first rate,
         wherein the first valve when in an open state forms a second aperture larger than the first aperture, wherein the second aperture is configured to pass air into the first chamber at a second rate faster than the first rate;
   a second chamber, comprising:
      a second chamber wall, and
      a second valve disposed in the second chamber wall,
         wherein the second valve when in a closed state forms a third aperture configured to pass air out of the second chamber at a third rate,
         wherein the second valve when in an open state forms a fourth aperture larger than the third aperture, wherein the fourth aperture is configured to pass air into the second chamber at a fourth rate faster than the third rate; and
   a plurality of connecting pillars connecting the first chamber to the second chamber,
      wherein the plurality of connecting pillars are configured to shift position or compress in response to an impact of first force,
      wherein the first valve is configured to pass air out of the first chamber at the first rate in response to an impact of second force, and
      wherein the second valve is configured to pass air out of the second chamber at the third rate in response to an impact of third force.

2. The impact absorbing apparatus of claim 1, wherein the first valve comprises a plurality of first valve leaflets, wherein each of the first valve leaflets comprises an outer wall connected to the first chamber wall, first and second side walls projecting away from the first chamber wall, and a curved inner wall opposite the outer wall, and wherein the curved inner walls of the first valve leaflets form Hall the first aperture configured to pass air out of the first chamber at the first rate when the first valve is in a closed position.

3. The impact absorbing apparatus of claim 2, wherein the second valve comprises a plurality of second valve leaflets, wherein each of the second valve leaflets comprises an outer wall connected to the second chamber wall, first and second side walls projecting away from the second chamber wall, and a curved inner wall opposite the outer wall, and wherein the curved inner walls of the second valve leaflets form the second aperture configured to pass air out of the second chamber at the third rate when the second valve is in a closed position.

4. The impact absorbing apparatus of claim 1, wherein the impact of second force is greater than the impact of first force.

5. The impact absorbing apparatus of claim 4, wherein the impact of third force is greater than the impact of second force.

6. The impact absorbing apparatus of claim 2, wherein the first valve leaflets form an obtuse angle of less than 180° with the first chamber wall when the first valve leaflets are in a closed state.

7. The impact absorbing apparatus of claim 6, wherein the obtuse angle is from about 120° to about 160°.

8. The impact absorbing apparatus of claim 3, wherein the second valve leaflets form an obtuse angle of less than 180° with the second chamber wall when the second valve leaflets are in a closed state.

9. The impact absorbing apparatus of claim 8, wherein the obtuse angle is from about 120° to about 160°.

10. The impact absorbing apparatus of claim 2, wherein the first valve leaflets form an obtuse angle of less than 130° with the first chamber wall when the first valve leaflets are in an open state.

11. The impact absorbing apparatus of claim 10, wherein the obtuse angle is from about 100° to about 120°.

12. The impact absorbing apparatus of claim 3, wherein the second valve leaflets form an obtuse angle of less than 130° with the second chamber wall when the second valve leaflets are in an open state.

13. The impact absorbing apparatus of claim 12, wherein the obtuse angle is from about 100° to about 120°.

14. The impact absorbing apparatus of claim 1, further comprising at least one first chamber reinstating pillar disposed in the first chamber, wherein the first chamber reinstating pillar is configured to apply a first force to return a compressed first chamber to its original shape.

15. The impact absorbing apparatus of claim 14, further comprising at least one second chamber reinstating pillar disposed in the second chamber, wherein the second chamber reinstating pillar is configured to apply a second force to return a compressed second chamber to its original shape.

16. The impact absorbing apparatus of claim 15, wherein the first force is smaller than the second force.

17. The impact absorbing apparatus of claim 14, wherein the at least one first chamber reinstating pillar is further configured to at least partially compress in response to the second impact to decrease an acceleration of the second impact.

18. The impact absorbing apparatus of claim 15, wherein the at least one second chamber reinstating pillar is further configured to at least partially compress in response to the third impact to decrease an acceleration of the second impact.

19. An impact absorbing apparatus, comprising:
a first chamber comprising:
  a first chamber wall, and
  a first valve disposed in the first chamber wall,
    wherein the first valve when in a closed state is configured to pass air out of the first chamber at a first rate,
    wherein the first valve when in an open state is configured to pass air into the first chamber at a second rate faster than the first rate;
a second chamber comprising:
  a second chamber wall, and
  a second valve disposed in the second chamber wall,
    wherein the second valve when in a closed state is configured to pass air out of the second chamber at a third rate,
    wherein the second valve when in an open state is configured to pass air into the second chamber at a fourth rate faster than the third rate; and
a plurality of connecting pillars connecting the first chamber to the second chamber, wherein:
  in response to a light impact the plurality of connecting pillars are configured to undergo primary compression,
  in response to a moderate impact the first valve is configured to pass air out of the first chamber, permitting secondary compression of the first chamber in addition to the primary compression of the connecting pillars, and
  in response to a hard impact the second valve is configured to pass air out of the second chamber, permitting tertiary compressing of the second chamber in addition to the secondary compression of the first chamber and the primary compression of the connecting pillars.

20. An impact absorbing apparatus, comprising:
a first chamber comprising:
  a first chamber wall, and
  a first valve disposed in the first chamber wall,
    wherein the first valve when in a closed state is configured to pass air out of the first chamber at a first rate,
    wherein the first valve when in an open state is configured to pass air into the first chamber at a second rate faster than the first rate;
a second chamber fluidly isolated from the first chamber and comprising:
  a second chamber wall, and
  a second valve disposed in the second chamber wall,
    wherein the second valve when in a closed state is configured to pass air out of the second chamber at a third rate,
    wherein the second valve when in an open state is configured to pass air into the second chamber at a fourth rate faster than the third rate; and
a plurality of connecting pillars disposed between and non-fluidly connecting the first chamber to the second chamber, wherein:
  in response to a first impact, the plurality of connecting pillars shift position and/or undergo primary compression to decrease acceleration of the first impact,
  in response to a second impact greater than the first impact, the first valve permits air to pass out of the first chamber, permitting secondary compression of the first chamber to decrease acceleration of the second impact,
  in response to a third impact greater than the second impact, the second valve permits air to pass out of the second chamber, permitting tertiary compressing of the second chamber to decrease acceleration of the third impact, and
  air does not pass between the first and second chambers in response to an impact.

* * * * *